United States Patent

Gallion et al.

[11] 3,884,516
[45] May 20, 1975

[54] MOTOR VEHICLE WITH IMPACT-DAMPING BUMPER

[75] Inventors: Georg A. Gallion, Wiesbaden; Klaus Weichsler, Florsheim; Horst Hullmann, Wicker; Horst Munzer, Russelsheim, all of Germany

[73] Assignee: General Motors Corporation, Detroit, Mich.

[22] Filed: May 20, 1974

[21] Appl. No.: 471,596

[30] Foreign Application Priority Data

June 15, 1973 Germany.......................... 2330494

[52] U.S. Cl. .............................. 293/69; 293/71 R
[51] Int. Cl. .............................................. B60r 19/08
[58] Field of Search...... 293/62, 63, 69, 71 R, 71 P, 293/1; 296/98, 31 P; 180/1 FV

[56] References Cited
UNITED STATES PATENTS

| | | | |
|---|---|---|---|
| 2,991,109 | 7/1961 | Milner | 293/69 R X |
| 3,583,756 | 6/1971 | Wilfert | 293/71 R X |
| 3,744,835 | 7/1973 | Carbone | 293/71 R X |
| 3,791,468 | 2/1974 | Bryan, Jr. | 293/69 R X |
| 3,829,141 | 8/1974 | Igwe | 293/71 R |

Primary Examiner—M. Henson Wood, Jr.
Assistant Examiner—John J. Love
Attorney, Agent, or Firm—S. Schwartz

[57] ABSTRACT

A motor vehicle has an impact-damping bumper comprising a rigid support member to which is secured a resilient member that has a high impact-damping capacity and extends over substantially the entire length of the support member. A spoiler, for increasing the dynamic wheel pressure of the vehicle, is arranged below the resilient bumper member, and extends obliquely rearwardly and downwardly from the bumper member, and parts such as a radiator grille, headlamps, and adjacent front body portions may be arranged above the resilient bumper member, the spoiler and other parts being integrally connected to the resilient member to form with it a one-piece construction. The resilient member has approximately the cross-sectional configuration of a rectangle open or almost open towards the rigid support member, and the spoiler merges laterally into the contours of adjacent wing portions of the vehicle. The upper side of the resilient member may have a projection which extends initially upwardly and then horizontally rearwardly beneath the headlamps, and possibly also the radiator grille. Ventilation apertures may be provided in the spoiler for cooling of the front wheel brakes or other parts.

6 Claims, 8 Drawing Figures 3,884,516

MOTOR VEHICLE WITH IMPACT-DAMPING BUMPER

This invention relates to motor vehicles having a bumper which consists of a rigid supporting part to which there is secured a resilient part which extends substantially over its length and has a high impact-damping capacity.

Bumpers of this kind are known, for example, in which the resilient part defines a number of air chambers with the rigid supporting part, by forming the resilient part of U-shaped cross-section with vertical webs which extend as far as the rigid supporting part. The result is that the impact-damping and absorbing capacity is increased. The resilient part is connected to the rigid supporting part either by joining or applying the resilient part to the rigid supporting part which is made of metal, after the rigid supporting part has already been secured to the vehicle body, or alternatively by first connecting together the parts in the course of pre-assembly and then jointly securing them to the body.

Above and below the bumper there are parts of the motor vehicle which must be connected to the bodywork sheeting and must therefore be separately mounted. Among these parts are included, for example, a spoiler serving to increase the dynamic wheel pressure and hence the speed of the vehicle, and the radiator grille and the headlamp casings. Since the radiator grille and headlamp casings will have already been secured in a special front portion, and this latter has to be joined to the vehicle body, the entire front portion counts among the parts which are to be mounted separately.

The separate mounting of these parts requires time, and in addition it needs special attachment means. The resilient supporting part consists of a plastics material having suitable properties, e.g. an integral polyurethane foam, the strength of this material being such that a certain inherent rigidity is ensured. It has also been recognised that certain parts of the forward structure, e.g. the radiator grille, can be satisfactorily produced from plastics material.

In order to attain the advantage of a simplified and cheapened assembly and at the same time to benefit from the advantage resulting from the production of certain parts from plastics material, by the present invention it is proposed that parts of the vehicle which are arranged below, and possibly also above, the bumper should be integrally connected to the resilient part to form one piece with the same.

Spoilers, as referred to above, are being used with increasing frequency. In order to attain an appreciable improvement in the air flow at the underside of the vehicle, the spoiler must extend more or less far downwardly. Its most appropriate dynamic form is however dependent on the remaining configuration of the vehicle. In all cases, the spoiler tends to be easily subject to damage, since it extends downwardly a condiderable distance.

In order to avoid damage to the spoiler through impact against kerbstones, for example, appropriately it also may be produced from resilient material. In order to attain the further advantage of simple and inexpensive manufacture and assembly, the invention proposes that the spoiler should be made in one piece with the resilient part.

Appropriately, in a manner known per se, the resilient part has the shape of closed rectangle or a rectangle which is almost open towards the rigid part, and the spoiler extends obliquely downwardly from the underside of the resilient part, whilst the section of the spoiler extending obliquely downwardly branches off from the resilient part close to the point of attachment to the rigid supporting part. In this way, it is possible to attain an excellently shaped transition from the resilient part to the spoiler. Moreover, the stiffness of this part, at least in the condition in which it is secured to the rigid supporting part, is improved if the spoiler branches off close to the point of attachment.

Since the bumper as such, and in particular the resilient part, is arranged somewhat in front of the remaining bodywork parts, and seeing that the bumper cannot be placed directly underneath the bodywork parts, there is generally a gap between the bumper and the radiator grille or the headlamp casings, as the case may be. In order to avoid this gap, which is booth unsightly and detrimental, according to a further feature of the invention it is proposed to provide the resilient part at its upper side with an extension or attachment which runs first of all upwardly and then horizontally rearwardly. The attachment is so designed and arranged that it runs underneath parts of the vehicle body. In this way, a direct transition is attained between the body work parts and the bumper.

Where necessary and expedient due to the arrangement of the front parts of the bodywork, it is preferable to allow this attachment to extend across the entire width of the front part. An appropriate construction is attained, for example, when the attachment is provided only at certain places below certain parts, e.g. underneath the headlamps. Between the attachments provided at certain places only, per se known covering lips are provided for the fixing means securing the resilient part to the rigid part.

It is known to design the spoiler in such a way that its lateral extremities curve round in the rearward direction and merge into the course of the wings. Appropriately, this construction is utilised with the spoiler according to the invention. Here the spoiler is in one-piece association with the resilient part of the bumper. Advantageously, the upwardly extending section of the attachment runs out at the sides of the resilient part, corresponding to the contour of the wings. The horizontally extending part of the attachment may rest against a flange or beaded edge of the bodywork sheeting, and if need be it may be additionally connected thereto.

The wall thickness of the spoiler may correspond approximately to the wall thickness of the resilient part, and the spoiler may be provided with reinforcing ribs applied to its rear side. In this way the essential stiffness of the spoiler attained, whilst there is the greatest possible saving of material. Appropriately, the reinforcing ribs run in the longitudinal direction of the vehicle.

The spoiler ensures that the air stream under the vehicle is made less. However, it thereby excludes air which is desirable for cooling certain units, particularly the front wheel brakes. In order to provide a remedy here, the present invention proposes to provide the spoiler with through apertures. These apertures may be arranged in each symmetrical half of the spoiler and in such a way that they are disposed at the locations of the units which are to be cooled. Effective cooling, particularly of the front wheel brakes, can be attained through these apertures, yet without the effect of the spoiler itself being substantially impaired.

According to a further feature of the invention, the radiator grille is in one piece with the resilient portion. From a production aspect, this has the considerable advantage that the radiator grille can be mounted simultaneously with the resilient part of the bumper, and, in the main, without any special manipulations. A particularly advantageous embodiment of the invention is attained by arranging that the radiator grille, and/or the sections of the front part which adjoin it, are formed in one piece with the resilient part over a certain length. In this case, in addition to the advantages from the aspect of production and assembly, there is the further advantage that due to a certain elasticity of the entire front part of the vehicle, the risk of injuries to pedestrians, from being hit, is considerably diminished. This protection to pedestrians is also afforded to a certain extent by the resilient spoiler. By making the front part of the vehicle from the material of the resilient part of the bumper, this front part is also better protected against damage.

A particularly favourable formation of the front part together with the spoiler is created if the front end of the radiator grille lies in front of the energy-absorbing resilient part, seen in the direction of travel, and if the radiator grille provides a bow-shaped configuration passing over across the resilient part into the obliquely downwardly extending spoiler.

In the case of the front part made in a one-piece association with the resilient part of the bumper, or in the case of the one-piece bodywork sections, appropriately the rear and/or lateral edge of the front part grips underneath the adjacent bodywork sheeting. In this case the bodywork sections made in one-piece association with the resilient part are bevelled off towards the edge. Besides ensuring attachment to the rigid supporting part of the bumper, adoption of this measure also ensures centring with respect to the adjoining bodywork. At the same time, the edge of the front part of the vehicle is able to grip underneath the adjacent bodywork sheeting with clamping action.

In certain circumstances it may be sufficient if the edge is simply provided with tongues or tabs which are made to lie under the bodywork shuting for the purpose of centring and/or fixing. The securing of the resilient part to the rigid supporting part of the bumper may be brought about in various ways. It has been found advantageous, however, to adopt a kind of fixing in which the rigid supporting part forms a rearwardly open rectangle and horizontally extending arms are bent over with their ends clamping, bolting or screwing, for example. upwardly and then forwardly, whilst the ends run at a distance from the arms corresponding approximately to the wall thickness of the resilient part. The edge portions of the resilient part are then appropriately clamped between the arms and its bent-over ends. A simple mode of fixing the resilient part to the rigid supporting part is also attained if the edge portions of the resilient part are bent over in such a way that they engage behind the ends of the arms of the rigid supporting part. The parts of the motor vehicle arranged below and/or above the bumper may be additionally secured to the adjoining bodywork parts by In the drawings:

Figure 1:
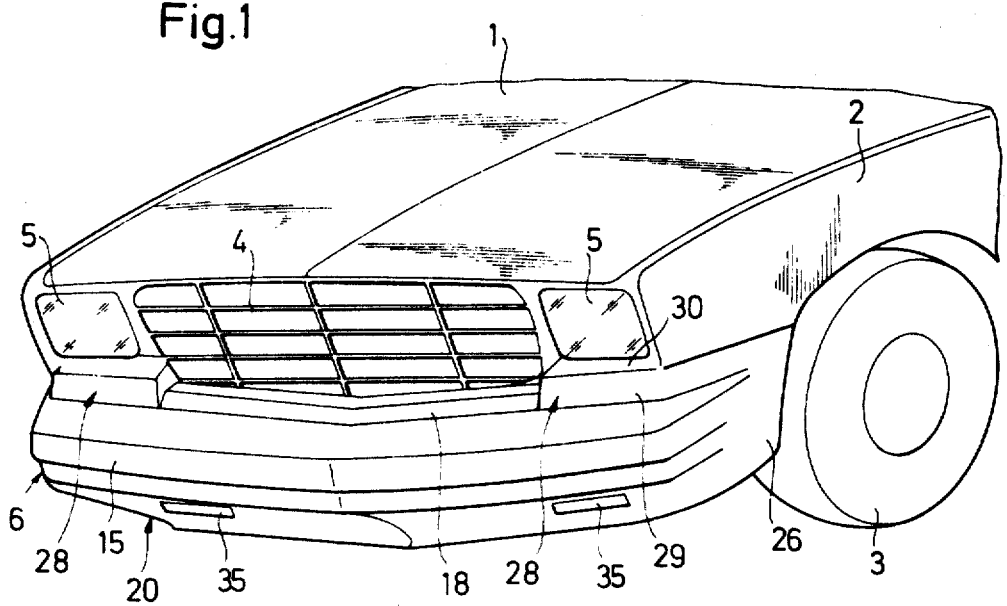
FIG. 1 is a perspective view of the front part of a motor vehicle in accordance with the invention, including a spoiler.
Figure 2:
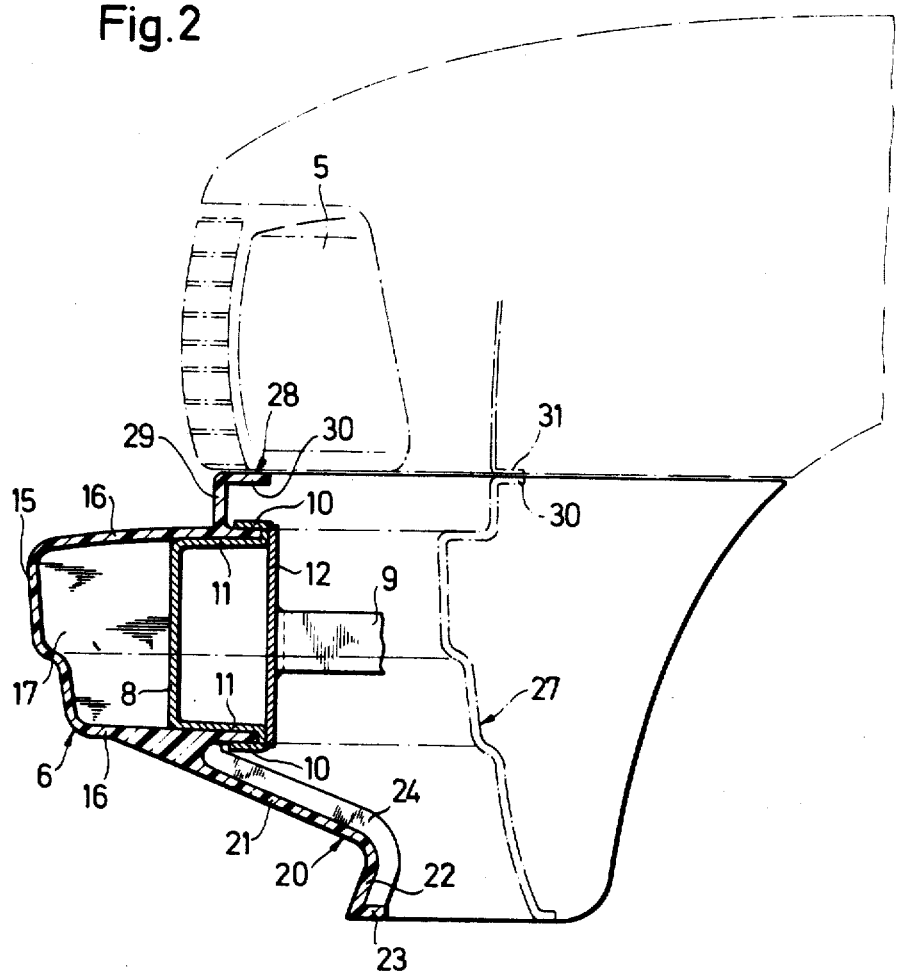
FIG. 2 is a section through the front part.

In FIG. 1, reference numeral 1 denotes the engine compartment bonnet, 2 the left-hand wing, and 3 the left-hand front wheel. Located at the front end face are the radiator grille 4 as well as the headlamps 5. The vehicle is fitted with bumper 6 which has the cross-sectional form indicated in FIG. 2. This bumper 6 consists of a rigid supporting part 8 which is firmly joined to the vehicle body, for example to the floor structure, in a suitable and wellknown manner, by means of a connecting piece 9. The rigid supporting part 8 is of U-shaped construction, and the upper and lower ends 10 of the arms 11 are bent over in such a way that they form return portions extending forwardly parallel to these arms 11. Between the U-shaped supporting part 8 and the connecting piece 9 there is a plate 12.

Figure 3:
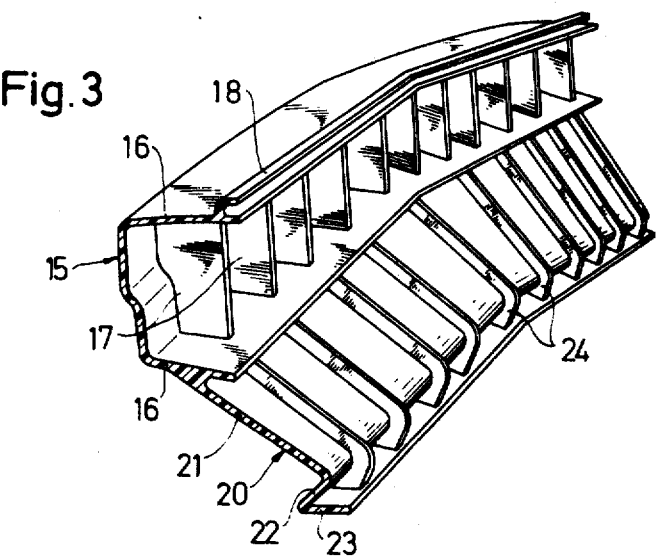
FIG. 3 is a perspective view of the resilient part of the bumper together with the spoiler, seen obliquely from the rear.

Secured to the rigid supporting part 8 there is the resilient part 15 which, in a manner known per se, has a certain shock-absorbing and impact-damping capacity. Its cross-sectional profile, like that of the rigid supporting part 8, is approximately U-shaped. Its arms 16 run approximately horizontally and they engage with their extremities in the space between the arms 11 and their bent-over ends 10 of the rigid supporting part 8. The resilient part 15 consists of integral polyurethane foam. It could, however, alternatively be produced from any other plastics material which exhibits the desired properties. In order to secure the resilient part 15 to the rigid supporting part 8, the extremities of the arms 16 are clamped between the arms 11 and their ends 10 belonging to the rigid supporting part 8. This allows preassembly of the parts, with the rigid supporting part being secured to the vehicle frame as usual by bolts or screws. Attachment of the resilient part to the supporting part could itself be achieved by screws, for example. For assembly by subsequent attachment of the resilient part to the supporting part, it would probably be preferred to utilise a screwing-on or similar fixing procedure. The resilient part 15 is also provided with webs 17, shown in FIG. 3, which serve to enhance the impact-damping capacity. In FIG. 3, which shows only a middle section of the resilient part 15, a covering lip 18 is shown at the upper arm 16. Its purpose is to conceal the fixing of the resilient part 15 to the rigid supporting part 8.

The spoiler 20, whose mode of operation is known, is formed in one piece with the resilient part 15. With a section 21 extending obliquely rearwardly and downwardly, the spoiler 20 adjoins the lower arm 16 of the resilient part 15. At the same time, the section 21 branches off from the resilient part 15 at a place on the latter which lies near the fixing point of this part 15 to the rigid supporting part 8. This place therefore lies in the vicinity of the end 10 of the lower arm 11 of the rigid supporting part 8.

At its lower end, the spoiler 20 is provided with a section 22 directed obliquely forwardly, which is adjoined by a short section 23 running horizontally rearwardly. As will be apparent, the wall thickness of the spoiler 20 corresponds approximately to the wall thickness of the resilient part 15. In order to stiffen the spoiler, it is furnished with ribs 24 which are provided at its rear side and are shown in FIG. 3. As will be seen particularly from FIG. 1, the spoiler 20, together with the resilient part 15, is bent over rearwardly with its lateral extremities 26 in such a way that it merges into the contour of the wing 2. At the same time the profile of the resilient part 15 decreases laterally in such a way that finally, near the front wheel 3, the spoiler forms a smooth face together with the wing 2. In dash-dot lines, FIG. 2 indicates a section 27 which illustrates the flattening of the profile of the resilient part 15 in this region.

Figure 4:
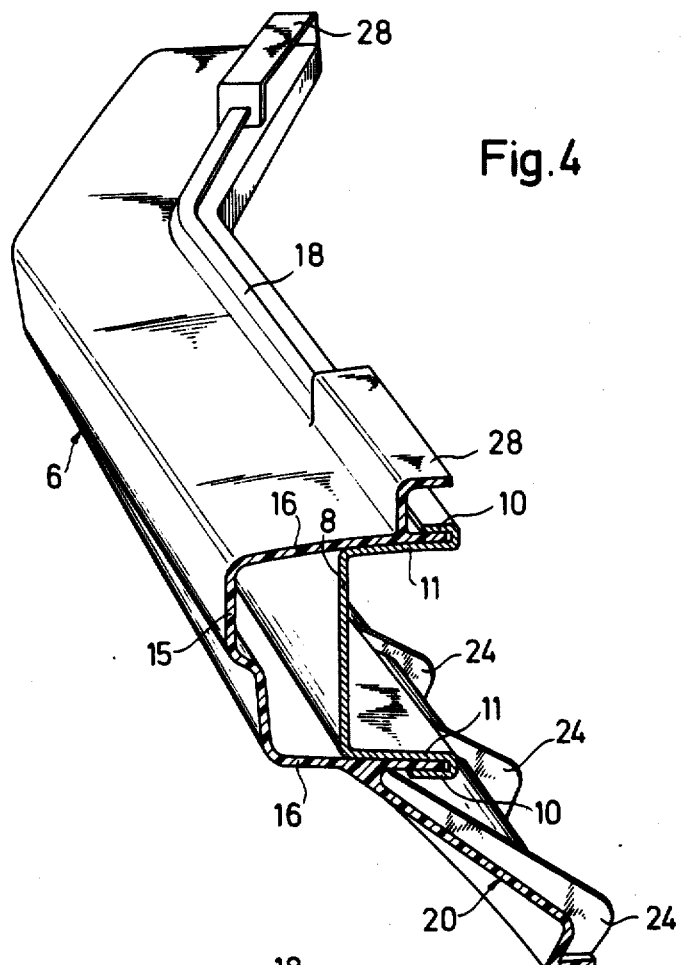
FIG. 4 is a perspective view of the resilient part with the spoiler, seen obliquely from the front.

At the upper arm 16 of the resilient part, underneath the headlamps 5, there are extensions or attachments 28 which consist of an upwardly extending section 29 and a horizontally extending section 30. At the same time, section 30 lies directly underneath the headlamp casing or the diffuser lens, so that no appreciable gap exists inbetween. The horizontally extending section 30 likewise extends laterally rearwardly and rests against a flanged edge 31 of the metal sheeting of the wing 2. At the same time the upwardly extending section 29 forms a short extension of the wing 2 in the downward direction. The covering lip 18 extends between the two attachments 28 in FIG. 1. The attachments 28 are also indicated in FIG. 4, in which however the lateral extremities of the bumper are shown cut away.

Figure 5:
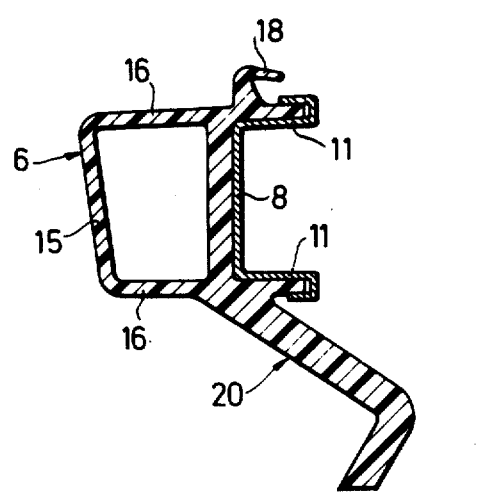
FIG. 5 is a cross-section through the resilient part, with a different formation of the spoiler.

In FIG. 5 a further cross-section of the resilient part 15 along with the spoiler 20 is illustrated, but, in contradistinction to the other Figures, the spoiler has a greater wall thickness so that reinforcing ribs are not required.

In FIG. 1 it is further apparent that the spoiler 20 is provided with two through apertures 35 which are arranged symmetrically in such a way that the air stream passing through them serves for cooling the front wheel brakes.

The radiator grille 4 may consist of one piece along with the resilient part 15, or it may be a separate piece. This alternative possibility is not illustrated specially, but will be apparent from FIG. 1. The advantage of simple assembly is clear. It may be necessary for parts or sections of the spoiler or other parts which lie very far from the resilient part 15 to be additionally connected or secured to the adjacent bodywork parts later, to ensure that they do not make oscillatory movements in response to shocks and vibrations, for example. The invention ensures however that the necessary strength connection of the bodywork parts, via the resilient part 15, is effected at the vehicle body, i.e. at the rigid supporting part.

FIG. 5 illustrates an embodiment of the front portion in which the bodywork sections adjoining the radiator grille and the headlamp casings consist of a resilient material over a certain length and are made in one piece with the resilient part of the bumper. This bodywork section is denoted by reference numeral 40 in FIG. 6. It contains the radiator grille 41 and the headlamps 42. The section 40 forms one resilient end piece along with the resilient part of the bumper (again denoted by 15) and with the spoiler 20. This end piece is also clearly apparent in side elevation in FIG. 7. The rigid supporting part 8 of the bumper is indicated in dash lines in FIG. 7. Connected to the supporting portion 8 there is a plate 12 which is joined by bent-over edge portions to the arms 11 of the supporting part 8. The connecting portion 9 secures the rigid supporting part 8 to the floor structure. For the purpose of securing the resilient part 15 to the rigid supporting part 8, the arms 16 of the resilient part 15 are provided with bent-over ends 44 which grip behind the arms 11 of the supporting part 8.

The bodywork section, or the end piece 40, engages with bevelled edge portions 45 underneath the adjacent body sheeting, so that, appropriately with a clamping action, centring and mounting of the end piece 40 at the remaining bodywork are effected. Instead of the edge portions 45 which grip behind the neighbouring bodywork sheeting, in certain circumstances it is merely necessary to fashion tabs or tongues 46 on the end piece 40, these engaging under the bodywork sheeting and serving for securing and mounting. To provide additional fixing, screws or clips, for example, may be employed.

Figure 6:
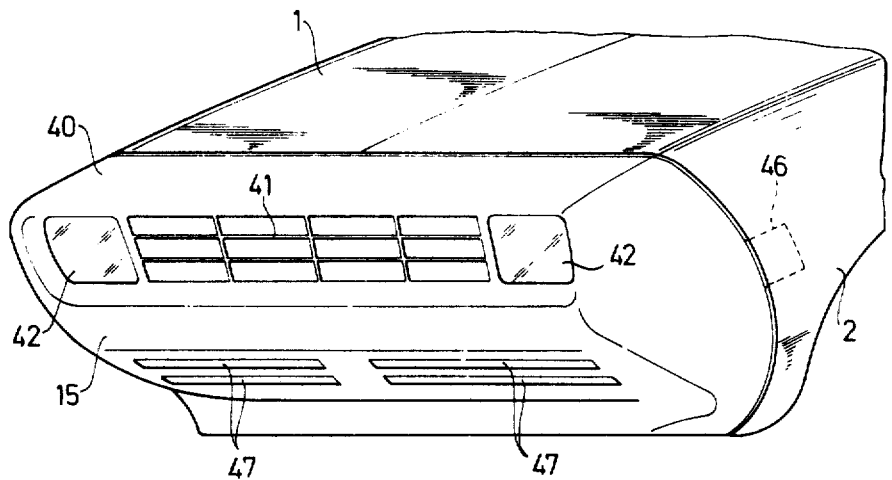
FIG. 6 is a perspective view of the front part with a front end portion formed of resilient material.
Figure 7:
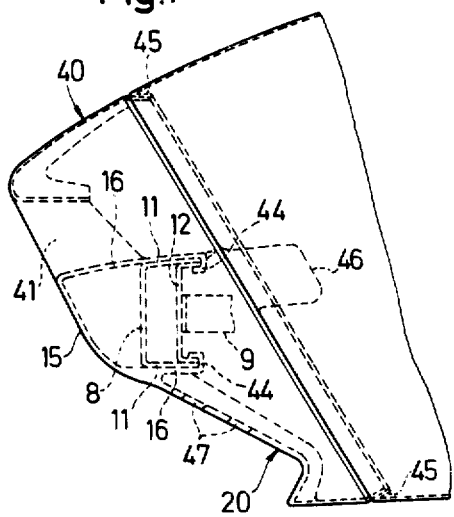
FIG. 7 is a side elevation of the FIG. 6 construction.
Figure 8:
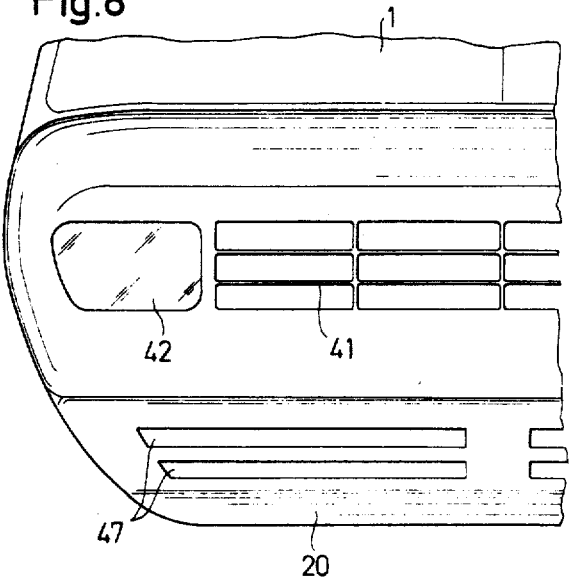
FIG. 8 is a partial front elevation of the FIg. 6 construction.

In FIGS. 6 to 8, the spoiler 20 is shown with two ventilation apertures 47 in each symmetrical lateral half. Again, these apertures serve to permit a flow of cooling air to certain units, particularly the front wheel brakes. As will be clear from FIG. 7, the upper end of the radiator grille lies in front of the resilient part 15, when seen in the direction of travel. The radiator grille forms part of a bow-shaped configuration passing over the resilient part 13 into the obliquely rearwardly extending spoiler.

In the above description and drawings, consideration has been given only to the front bumper and the adjacent parts of the motor vehicle. Corresponding measures might be adopted likewise for the rear bumper and the parts adjacent thereto. Thus, for example, the rear wall of the trunk compartment and/or parts of the rear wing could be of one-piece construction with a resilient bumper part.

We claim:

1. In a motor vehicle, a bumper comprising a rigid supporting member extending in a direction generally transversely of the vehicle, a resilient member which has a high impact-damping capacity and extends substantially the whole length of the support member, the resilient member forming with the support member a cross-sectional shape approximating to a closed rectangle, means securing the resilient member to the support member along the length thereof, and a spoiler — for increasing the dynamic wheel pressure of the vehicle — integrally connected to the resilient member to form a one-piece construction therewith and extending obliquely downwardly from a location at the under side of the resilient member close to said securing means.

2. In a motor vehicle having a body including a pair of headlamps and, extending rearwardly therefrom, body wing portions forming wheel arches for respective front wheels of the vehicle, a bumper comprising a rigid support member which extends in a direction generally transversely of the vehicle, a resilient member which consists of polyurethane integral foam and has a high impact-damping capacity and extends substantially the whole length of the support member, to form with the support member a cross-sectional shape approximating to a closed rectangle, upper and lower return portions of the support member securing the resilient member to the support member along the length thereof, a spoiler integrally connected to the resilient member along substantially the whole width of the vehicle to form a one-piece construction with the resilient member, the spoiler extending obliquely downwardly and rearwardly from the under side of the resilient member at a location adjacent the lower return portion of the support member, a pair of integral projections extending initially upwardly from the upper side of the resilient member adjacent the upper return portion of the support member and then extending horizontally rearwardly underneath parts of the vehicle body in the vicinity of the headlamps, an integral covering lip formed on the upper side of the resilient member between the integral projections and forming a cover for the upper return portion of the support member, and end portions of the upwardly extending parts of the integral projections merging into the contours of the respective body wing portions.

3. A motor vehicle having a bumper comprising a rigid support member which extends in a direction generally transversely of the vehicle, a resilient member which has a high impact-damping capacity and extends along substantially the whole length of the support member, the resilient member having a channel-like cross-section and forming with the support member a cross-sectional shape approximating to a closed rectangle, means securing the resilient member to the support member along the length thereof, a spoiler which extends along substantially the whole length of the support member and is integrally connected to the resilient member to form a one-piece construction therewith and extends obliquely downwardly from a location at the under side of the resilient member in the region of said securing means, the spoiler having a wall thickness substantially corresponding to the wall thickness of the resilient member, a plurality of reinforcing ribs which are provided on the rear side of the spoiler over substantially the whole width of the vehicle and extend in the longitudinal direction of the vehicle, and end portions of the spoiler merging into the contours of adjacent wing portions of the vehicle.

4. A motor vehicle having a bumper comprising a bowed rigid support member extending transversely of the vehicle, a correspondingly bowed resilient member consisting of polyurethane integral foam of high impact-damping capacity, upper and lower securing means securing said members together over substantially the whole width of the vehicle to provide a cross-sectional configuration approximating to a closed rectangle, an obliquely downwardly extending bowed spoiler integrally connected to the under side of the resilient member over substantially the whole width of the vehicle to form a one-piece construction with the resilient member, and at least one through aperture in each lateral half-portion of the bowed spoiler at a location longitudinally aligned with operative parts on the under side of the vehicle which are to be cooled.

5. A motor vehicle having a bumper comprising a rigid support member which extends in a direction generally transversely of the vehicle, a resilient member which has a high impact-damping capacity, upper and lower securing means securing said members together over substantially the whole width of the vehicle to form a transversely extending hollow box structure, a spoiler forming a one-piece construction with the resilient member and extending obliquely downwardly and rearwardly from an integral connection to the under side of the resilient member over substantially the whole width of the vehicle, a plurality of through apertures in the spoiler at locations symmetrically disposed with respect to the longitudinally extending vertical centre plane of the vehicle, a radiator grille and adjacent front body portions of the vehicle forming a one-piece construction with the resilient member and extending obliquely upwardly and forwardly from an integral connection to the upper side of the resilient member, such that at least the upper part of the front portion of the radiator grille is positioned forwardly of the resilient member, and edge regions of the front body portions of the vehicle engaging under adjacent edge regions of a main forward body portion of the vehicle to provide a secure support for the resilient bumper member and the parts integral therewith.

6. A motor vehicle having a bumper comprising a rigid support member which extends transversely of the vehicle and is mounted to floor structure of the vehicle, the support member having a rearwardly open rectangular cross-section, a resilient member which extends transversely of the vehicle and has bent-over edge portions securing the resilient member to rearwardly directed edge portions of the rigid support member, a spoiler integrally connected to the resilient member to form a one-piece construction therewith and extending obliquely downwardly and rearwardly therefrom over at least the major portion of the width of the vehicle, ventilation apertures extending through the spoiler in each laterally symmetrical half thereof for inducing an air flow for cooling front wheel brakes of the vehicle, a radiator grille and adjoining bodywork sections integrally connected to the resilient member to form a one-piece construction therewith, such that the upper end of the radiator grille is located forwardly of the resilient member and the radiator grille forms part of a bow-shaped configuration passing over by way of the resilient member into the obliquely rearwardly extending spoiler, and means mounting and securing said one-piece integral front section to a main forward body portion of the vehicle.

* * * * *